US011252606B2

(12) United States Patent
Pocha et al.

(10) Patent No.: US 11,252,606 B2
(45) Date of Patent: Feb. 15, 2022

(54) ENHANCED FIXED BROADBAND ACCESS NETWORK—MOBILE NETWORK INTEGRATION FOR EFFICIENT LOCAL TRAFFIC OFFLOADING

(71) Applicant: Cisco Technology, Inc., San Jose, CA (US)

(72) Inventors: Raghunadha Reddy Pocha, Bengaluru (IN); Sateesh Reddy Mommidi, Bangalore (IN); Ravi Sankar Mantha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/906,266

(22) Filed: Jun. 19, 2020

(65) Prior Publication Data

US 2021/0076257 A1 Mar. 11, 2021

Related U.S. Application Data

(63) Continuation of application No. 16/561,283, filed on Sep. 5, 2019, now Pat. No. 10,735,995.

(51) Int. Cl.
*H04W 88/16* (2009.01)
*H04W 28/08* (2009.01)
(Continued)

(52) U.S. Cl.
CPC .......... *H04W 28/08* (2013.01); *H04W 12/06* (2013.01); *H04W 28/0263* (2013.01); *H04W 76/11* (2018.02); *H04W 76/15* (2018.02)

(58) Field of Classification Search
CPC ..... H04W 28/08; H04W 76/15; H04W 12/06; H04W 28/0263; H04W 76/11; H04W 76/12
See application file for complete search history.

(56) References Cited

U.S. PATENT DOCUMENTS 8,849,273 B2   9/2014 Rui et al.
2011/0286396 A1   11/2011 Kato et al.
(Continued)

FOREIGN PATENT DOCUMENTS

EP          2702785 B1    12/2014
WO   WO-2018233484 A1 *  12/2018   ......... H04L 12/2859
WO   WO-2018233485 A1 *  12/2018   ............ H04W 76/11

OTHER PUBLICATIONS

Vojislav Vucetic, "Mobile Broadband Evolution", Asia Technology Forum, Dec. 4-5, 2008, 158 pages.
(Continued)

*Primary Examiner* — Jay P Patel
(74) *Attorney, Agent, or Firm* — Edell, Shapiro & Finnan, LLC

(57) ABSTRACT

An enhanced, fixed broadband access network—mobile network integration for integrating fixed broadband access networks and mobile networks may include a network node having a Broadband Network Gateway (BNG) User Plane (UP) (BNG-UP) function operative to serve as a Branching Point (BP) User Plane Function (UPF). The network node may include a network interface to interface with a Control Plane (CP) for session management and a network interface to interface with a BNG Control Plane (BNG-CP) function. The network node may be configured to process UP traffic based on one or more sets of rules, to forward first UP traffic towards a first UPF to a Data Network (DN) and to forward second UP traffic towards a second UPF to a Local Area Data Network (LADN). Sessions with the CP for session management and the BNG-CP may be identified as related sessions for appropriate processing of the UP traffic.

20 Claims, 13 Drawing Sheets

(51) Int. Cl.
  *H04W 76/15* (2018.01)
  *H04W 12/06* (2021.01)
  *H04W 28/02* (2009.01)
  *H04W 76/11* (2018.01)

(56) References Cited

U.S. PATENT DOCUMENTS

| | | | |
|---|---|---|---|
| 2013/0103846 | A1 | 4/2013 | Zhou et al. |
| 2014/0378131 | A1 | 12/2014 | Rui et al. |
| 2016/0127371 | A1 | 5/2016 | Dhammawat |
| 2016/0174145 | A1 | 6/2016 | Zee et al. |
| 2018/0103363 | A1 | 4/2018 | Faccin et al. |
| 2018/0309755 | A1 | 10/2018 | Mishra |
| 2018/0352483 | A1 | 12/2018 | Youn et al. |
| 2019/0052580 | A1 | 2/2019 | Peng et al. |
| 2019/0052603 | A1 | 2/2019 | Wu |
| 2019/0116624 | A1 | 4/2019 | Tandon et al. |
| 2019/0166210 | A1 | 5/2019 | Froger |
| 2019/0313318 | A1 | 10/2019 | Pawar et al. |
| 2019/0364420 | A1 | 11/2019 | Rommer et al. |
| 2020/0107388 | A1* | 4/2020 | Yu .................. H04W 76/25 |
| 2020/0128087 | A1* | 4/2020 | Yu .................. H04L 45/50 |

OTHER PUBLICATIONS

ETSI, "Digital cellular telecommunications system (Phase 2+); Universal Mobile Telecommunications System (UMTS); LTE; 3GPP system—fixed broadband access network interworking; Stage 2 (3GPP TS 23.139 version 11.3.0 Release 11)", ETSI TS 123 139 V11.3.0, Jan. 2013, 90 pages.
Cisco, "Broadband Network Gateway Overview", Cisco ASR 9000 Series Aggregation Services Router Broadband Network Gateway Configuration Guide, Release, https://www.cisco.com/c/en/us/td/docs/routers/asr9000/software/asr9k_r5-2/bng/configuration/guide/b-bng-cg52xasr9k/b-bng-cg52xasr9k_chapter_010.pdf, downloaded Jun. 13, 2019, 10 pages.
Cisco, "Evolved Packet Data Gateway Overview", ePDG Administration Guide, StarOS Release 20, https://www.cisco.com/c/en/us/td/docs/wireless/asr_5000/20/ePDG/b_20-ePDG-Admin/b_20-ePDG-Admin_chapter_01.html, May 31, 2016, 90 pages.
3GPP, "3rd Generation Partnership Project; Technical Specification Group Services and System Aspects; Wireless and wireline convergence access support for the 5G System (5GS) (Release 16)", 3GPP TS 23.316 V16.0.0, Jun. 2019, 63 pages.
3GPP, "3rd Generation Partnership Project; Technical Specification Group Services and System Aspects; 3GPP system—fixed broadband access network interworking; Stage 2 (Release 15)", 3GPP TS 23.139 V15.0.0, Jun. 2018, 88 pages.
CSpire, "Broadband Technology Options", A Paper by the C Spire Rural Broadband Consortium, downloaded Mar. 11, 2020, 33 pages.
Huawei Technologies Co., Ltd., "Technical White Paper on Cloud-based BNG with Control Plane and User Plane Separated Architecture", downloaded Mar. 11, 2020, 12 pages.
Lachapelle, Paul, "Broadband Evolution and Fixed Mobile Convergence", Nov. 12, 2019, 18 pages.
The Broadband Forum, "TR-203 Interworking between Next Generation Fixed and 3GPP Wireless Networks", Issue: 1, Aug. 2012, 68 pages.
L. Xue et al., "Problem Statement for Fixed Mobile Convergence", draft-xue-fmc-ps-03.txt, Network Working Group, Internet-Draft, Intended status: Informational, Oct. 22, 2012, 14 pages.
Wadhwa, Sanjay, "Disaggregating the Broadband Network Gateway", https://www.nokia.com/blog/disaggregating-broadband-network-gateway/, Oct. 21, 2019, 7 pages.

\* cited by examiner

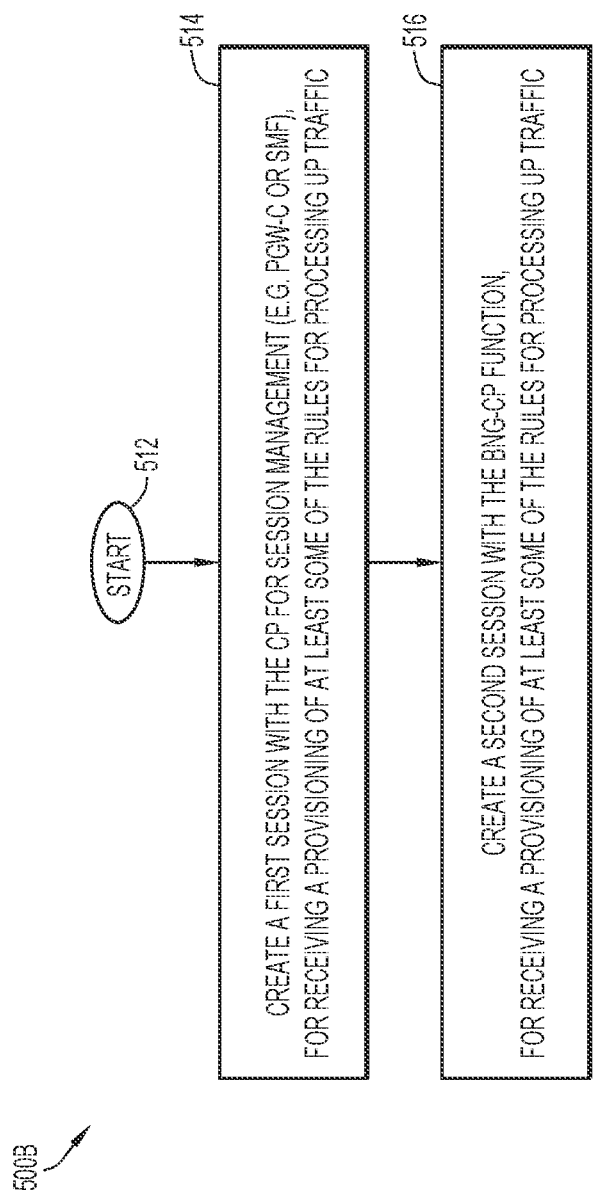

ENHANCED FIXED BROADBAND ACCESS NETWORK—MOBILE NETWORK INTEGRATION FOR EFFICIENT LOCAL TRAFFIC OFFLOADING

CROSS-REFERENCE TO RELATED APPLICATIONS

This application is a continuation of U.S. patent application Ser. No. 16/561,283, filed Sep. 5, 2019, the entirety of which is incorporated herein by reference.

TECHNICAL FIELD

The present disclosure relates generally to systems for fixed broadband access network—mobile network integration for integrating fixed broadband access networks and mobile networks.

BACKGROUND

Architectures, functionalities and procedures for fixed broadband access network—mobile network integration, for integrating fixed broadband access networks and mobile networks, are defined by the Third Generation Partnership Project (3GPP). Such integration of a fixed broadband access network may be made in relation to a Fourth Generation (4G)/Long-Term Evolution (LTE) based network (e.g. one employing a Control and User Plane Separation or "CUPS" architecture) or a Fifth Generation (5G) network.

What are needed are more efficient techniques and mechanisms in a fixed broadband access network—mobile network integration, especially for a local offloading of traffic to a local area data network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5C are flowcharts of methods of facilitating communication by the network node having the collocated BNG-UP/BP-UPF in the enhanced fixed broadband access network—mobile network integration according to some implementations;

DESCRIPTION OF EXAMPLE EMBODIMENTS

Figure 1A:
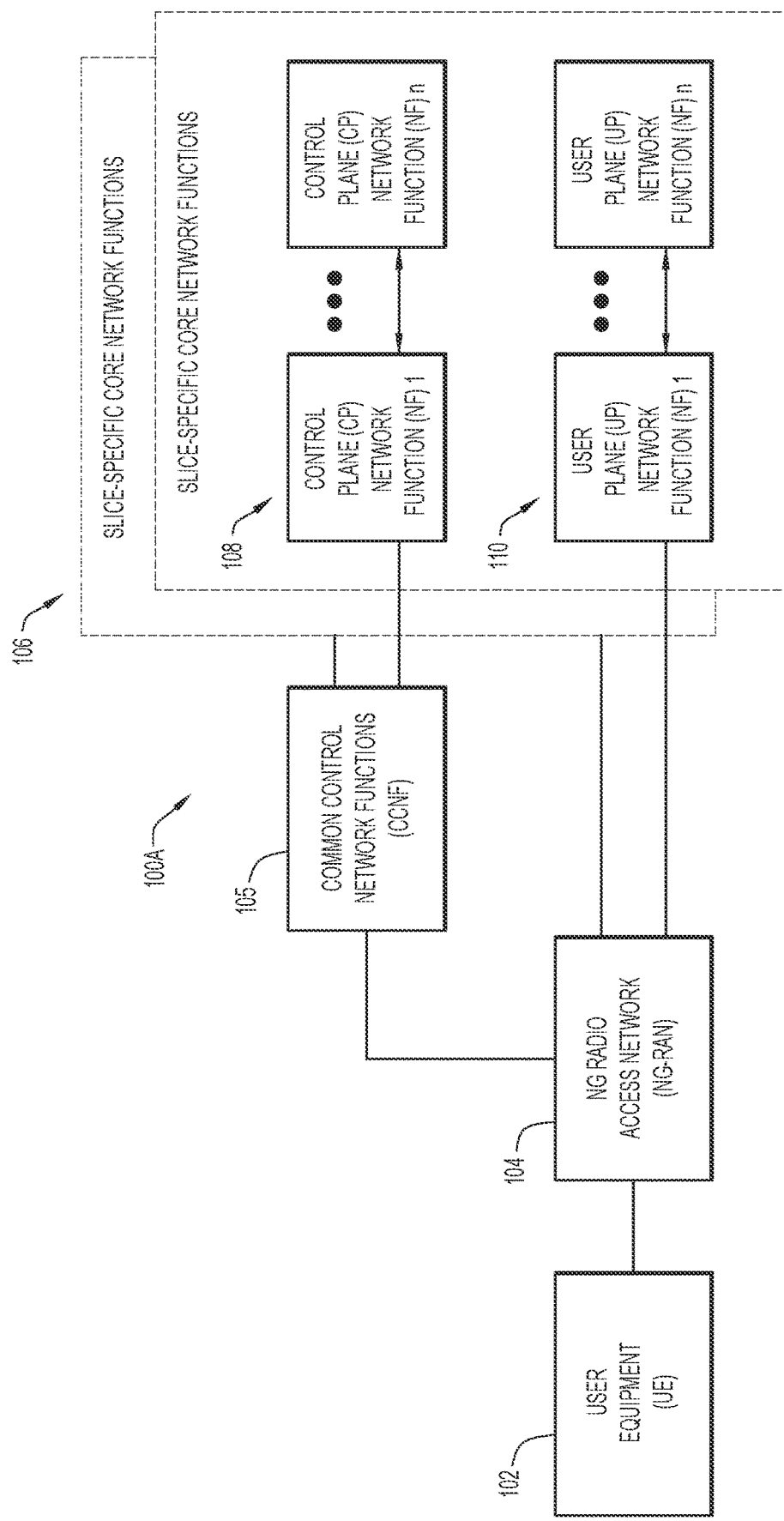
FIG. 1A is an illustrative representation of a general network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Efficient techniques and mechanisms of an enhanced fixed broadband access network—mobile network integration, especially suitable for a local offloading of traffic to a local area data network, are described herein.

In one illustrative example, an enhanced, fixed broadband access network—mobile network integration for integrating fixed broadband access networks and mobile networks may include a network node having a Broadband Network Gateway (BNG) User Plane (UP) (BNG-UP) function operative to serve as a Branching Point (BP) User Plane Function (UPF) (or "collocated BNG-UP and BP UPF"). The network node may include a network interface to interface with a Control Plane (CP) for session management and a network interface to interface with a BNG Control Plane (BNG-CP) function. The CP for session management may be, for example, a Packet Gateway—CP (PGW-C) or a Session Management Function (SMF).

Sessions may be established with both the CP for session management and the BNG-CP function for sending the network node one or more sets of rules for processing UP traffic. For appropriate processing of the UP traffic, the sessions with both the CP for session management and the BNG-CP may be identified as related sessions based on a matching of a session identifier of a session with the CP for session management.

The network node comprising the BNG-UP function operative to serve as the BP UPF may receive the UP traffic from Customer Premises Equipment (CPE) (e.g. via the BNG-CP function) and process the UP traffic based on the one or more sets of rules. The network node may process the UP traffic based on the one or more sets of rules at least to forward first UP traffic towards a first UPF to a Data Network (DN) and to forward second UP traffic towards a second UPF to a Local Area Data Network (LADN).

More detailed and alternative techniques and implementations are provided herein as described below.

Example Embodiments

As described above, architectures, functionalities and procedures for fixed broadband access network—mobile network integration for integrating fixed broadband access networks and mobile networks are defined by the Third Generation Partnership Project (3GPP). See e.g. 3GPP Technical Specification (TS) 23.139, Technical Specification Group Services and System Aspects; 3GPP system—fixed broadband access network interworking; Stage 2 (Release 12), V12.2.0 (2015-03). Such integration of a fixed broadband access network may be employed in relation to a Fourth Generation (4G)/Long-Term Evolution (LTE) based network (e.g. one employing a Control and User Plane Separation or "CUPS" architecture) or a Fifth Generation (5G) network.

What are described herein are efficient techniques and mechanisms of an enhanced fixed broadband access network—mobile network integration, which are especially suitable for a local offloading of traffic to a local area data network. In some implementations as described herein, the enhanced system is implemented in relation to a 5G network.

To better illustrate in relation to the drawings, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a user equipment (UE) 102. UE 102 may obtain access to the 5G network via a radio access network (RAN) or a Next Generation (NG) RAN (NG-RAN) 104. NG-RAN 104 may include one or more base stations such as a gNodeB (gNB) 107. UE 102 may be any suitable type of device, such as a cellular telephone, a smart phone, a tablet device, an Internet of Things (IoT) device, a machine-to-machine (M2M) device, and a sensor, to name but a few.

The network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of functionalities provided by CCNF 105.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
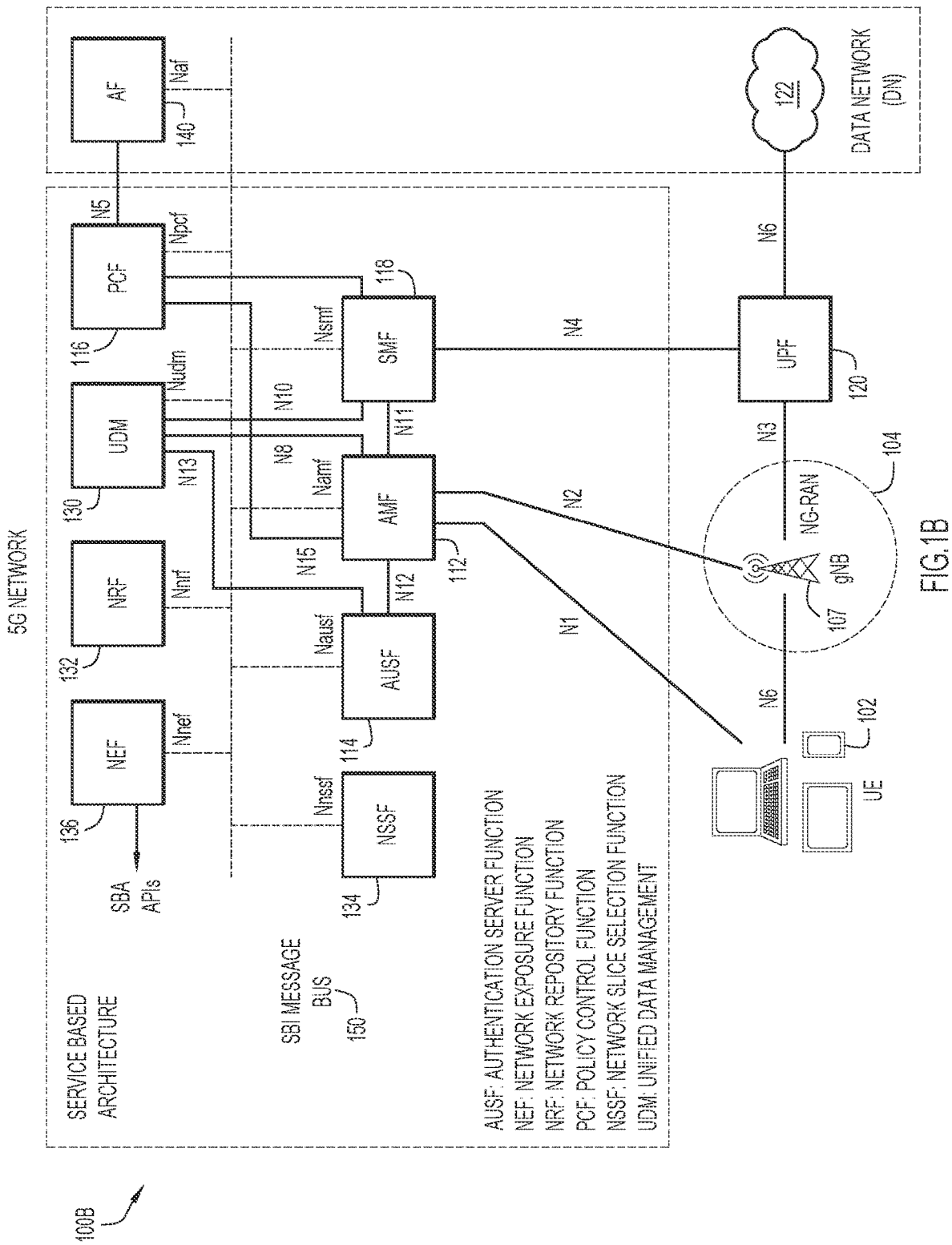
FIG. 1B is an illustrative representation of a more detailed network architecture of the 5G network of FIG. 1A.

FIG. 1B is an illustrative representation of a more detailed network architecture 100B of the 5G network of FIG. 1A. As provided in 3GPP standards for 5G (e.g. 3GPP Technical Specifications or "TS" 23.501 and 23.502), network architecture 100B for the 5G network may include an AMF 112, an authentication server function (AUSF) 114, a policy control function (PCF) 116, an SMF 118, and a UPF 120 which may connect to a data network (DN) 122. Other NFs in the 5G network include an NSSF 134, a network exposure function (NEF) 136, a network function (NF) repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane (UP) and all other NFs (i.e. AMF 112, AUSF 114, PCF 116, SMF 118, and UDM 130) are part of the control plane (CP). UPF 120 may be a session anchor for one or more Packet Data Unit (PDU) sessions associated with UE 102. Separation of user and control planes may guarantee that each resource may be scaled independently. It may allow UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again whereby the control plane functionality and common data repositories are provided by way of the set of interconnected NFs, each with authorization to access each other's services. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an application function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for the AF 140 to securely provide information to the 5G network.

In general, NRF 132 may maintain NF profiles of available NF instances and their associated services, and support a service discovery function for service discovery associated with the NF profiles. NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response.

Figure 1C:
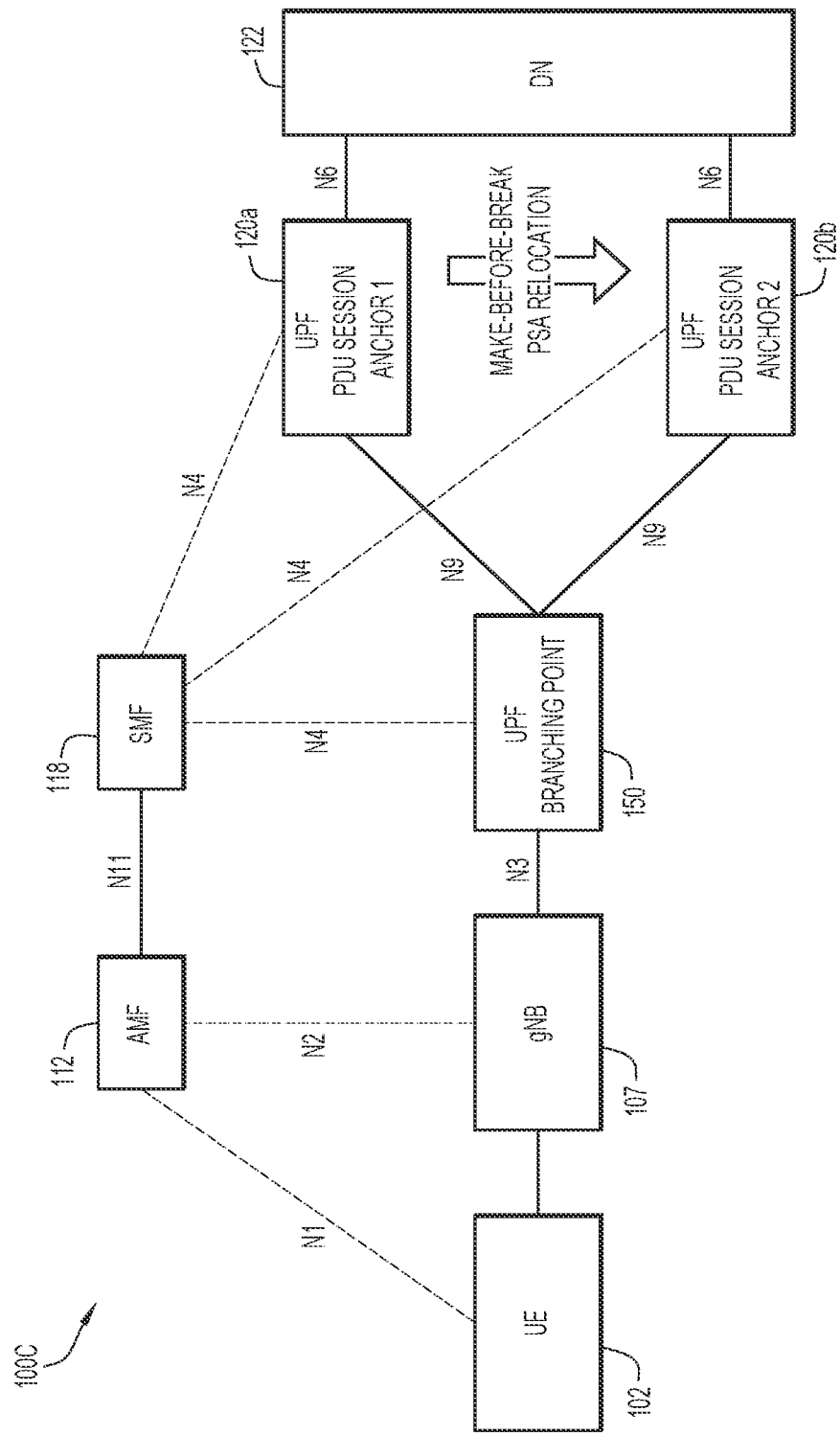
FIG. 1C is an illustrative representation of a network node arrangement of select network nodes of the 5G network of FIG. 1B, further including a Branching Point User Plane Function (UPF) to forward User Plane (UP) traffic to different UPF session anchors.

FIG. 1C is an illustrative representation of a network node arrangement 100C of select network nodes of the 5G network of FIG. 1B. In the network node arrangement 100C of FIG. 1C, the UPF of FIG. 1B is replaced with a Branching Point UPF 150 which receives UP traffic over the N3 interface from gNB 107. Branching Point UPF 150 may serve as an Intermediate UPF (I-UPF) which is multi-homed to more than one PDU session anchor (PSA). More specifically, Branching Point UPF 150 is shown to interface with a UPF 120*a* which is a first PSA and with a UPF 120*b* which is a second PSA. UE 102 may be assigned separate source IP prefixes for each PSA, and may select one of those source prefixes based on address selection policies. The Branching Point UPF 150 may have uplink (UL) forwarding rules associating each source IP prefix with a PSA (e.g. UPF 120*a* or 120*b*). Downlink (DL) traffic received from all serving locations may be sent by Branching Point UPF 150 towards gNB 107 or the access network serving the PDU session.

Figure 2:
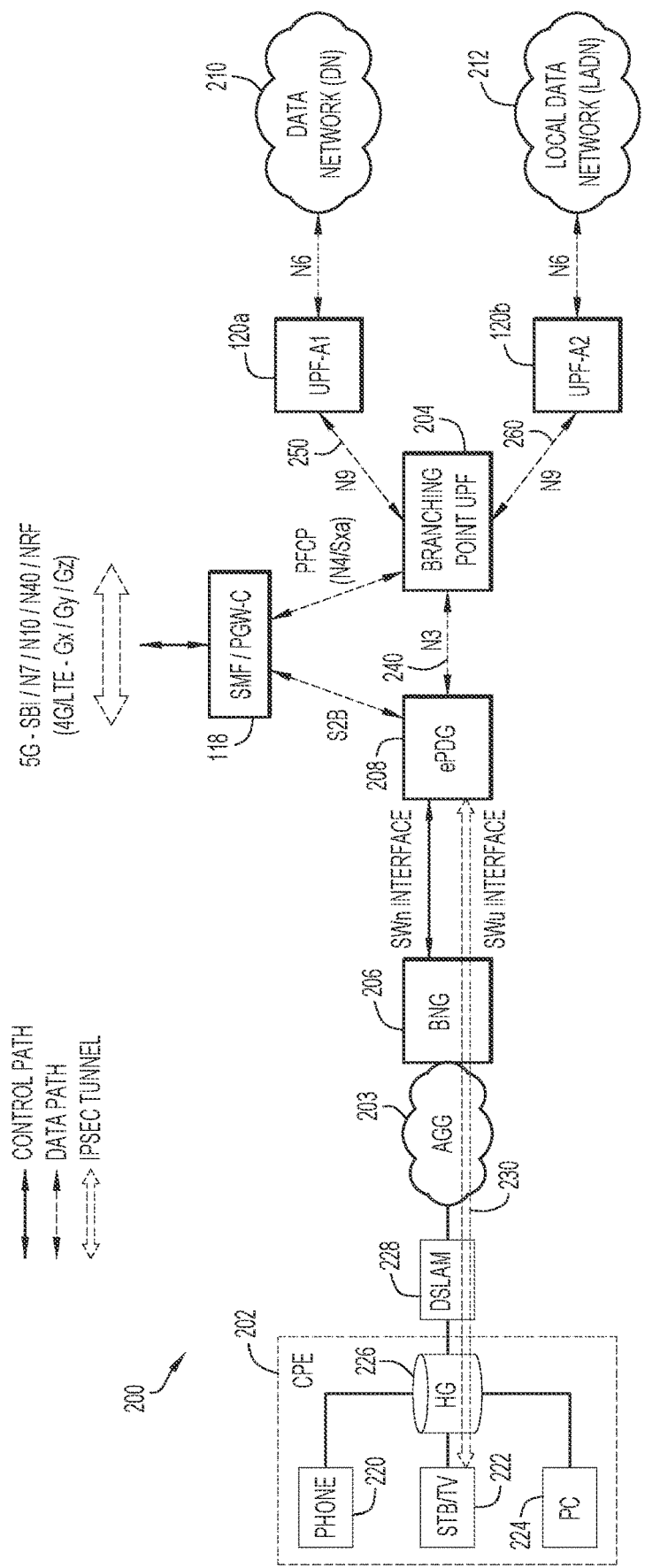
FIG. 2 is an illustrative representation of a system for fixed broadband access network—mobile network integration between a fixed broadband access network and the 5G network, where a Broadband Network Gateway (BNG) is integrated in the 5G network of FIG. 1B using an enhanced Packet Data Gateway (ePDG) connected to a Branching Point UPF.

FIG. 2 is an illustrative representation of a system 200 for fixed broadband access network—mobile network integration between a fixed broadband access network and the 5G network of FIGS. 1A-1C. For a standards-based description of such general interworking, see e.g. 3GPP TS 23.139 as referenced earlier.

In FIG. 2, the system 200 for the fixed broadband network may include Customer Premises Equipment (CPE) 202 which connects to a Home Gateway (HG) 226. CPE 202 may include devices such as a landline telephone 220, a set-top box (STB)/television (TV) 222, and/or a personal computer (PC) 224 (i.e. voice, video, and data). CPE 202 may further include a UE operative in a wireless network. Through HG 226, CPE 202 may connect to a broadband network gateway (BNG) router or BNG 206, via a Digital Subscriber Line Access Multiplexer (DSLAM) 228 and an aggregator network (AGG) 203. In practice, multiple HGs 226 may connect to DSLAM 228 for sending aggregated traffic to BNG 206.

For subscribers, BNG 206 may be considered to be an access point through which they connect to a broadband network. When a connection is established between CPE 202 and BNG 206, a subscriber may access broadband services of the broadband network provided by a Network Service Provider (NSP) or Internet Service Provider (ISP). BNG 206 is configured to establish and manage subscriber sessions. When a session is active, BNG 206 may aggregate traffic from various subscriber sessions of an access network and route the traffic appropriately.

Typically, BNG 206 is deployed by the service provider and may be present at a first aggregation point in the network. This first aggregation point in the network may be an edge router configured to serve as the BNG 206. As the subscriber may directly connect to this edge router, BNG 206 may manage most or all subscriber access and subscriber management functions. Thus, BNG 206 may be configured to interact with peripheral devices (e.g. CPE 202) and servers to provide broadband connectivity to subscribers and manage the subscriber sessions. In general, subscriber management functions may be or include authentication, authorization and accounting of subscriber sessions, address assignment, security, policy management, and Quality of Service (QoS).

Each subscriber may connect to the network in a logical session. For example, BNG 206 may be configured to establish subscriber sessions using Point-to-point (PPP) over Ethernet (PPPoE) or IP over Ethernet (IPoE). BNG 206 may rely on an external Remote Authentication Dial-In User Service (RADIUS) server to provide Authorization, Authentication, Accounting (AAA) functions for subscribers (e.g. to authenticate subscribers and keep an account of subscriber sessions). In addition, BNG 206 may rely on an external Dynamic Host Configuration Protocol (DHCP) server for address allocation and client configuration functions.

BNG 206 may be integrated with the 5G network of FIG. 1B using an enhanced Packet Data Gateway (ePDG) 208. The ePDG 208 may be configured for interworking between the mobile core and untrusted non-3GPP networks (e.g. the fixed broadband network) for secure access. The ePDG 208 may enable mobile operators to extend wireless service coverage, reduce the load on the macro-wireless network, and make use of existing backhaul infrastructure to reduce the cost of carrying wireless calls. The ePDG 208 may function as a security gateway to provide network security and interworking control, via IPSec tunnel establishment based on information obtained during AAA. The ePDG 208 may be used for IPsec tunnel establishment, tunnel authentication and authorization, transport level packet marking in the uplink, policy enforcement of QoS based on information received via AAA, and lawful interception functions.

As shown in FIG. 2, the ePDG 208 may connect to a Branching Point UPF 204 over an N3 interface. Similar to that shown and described in relation to FIG. 1C, Branching Point UPF 204 may interface with UPF 120*a* which may be a first PSA and interface with UPF 120*b* which may be a second PSA. UP traffic from CPE 202 may be routed from BNG 206 over an IPSec tunnel 230 to ePDG 208. The ePDG 208 may further route the UP traffic as a UP traffic 240 over the N3 interface to Branching Point UPF 204.

Branching Point UPF 204 may receive the UP traffic 240 and route it over an N9 interface as a first UP traffic 250 to UPF 120a, for communication to a data network (DN) 210. On the other hand, Branching Point UPF 204 may receive the UP traffic 240 and route it over an N9 interface as a second UP traffic 260 to UPF 120b, for communication to a local area data network (LADN) 212. For CP signaling, SMF 118 (or other CP for session management such as a Packet Gateway—Control Plane or "PGW-C") may interface with ePDG 208 via an S2b interface and to UPF Branching Point 204 via an N4 interface. SMF 118 may have one or more interfaces with the mobile network, including the SBI, N7, N10, N40, NRF interfaces (or interfaces for 4G/LTE, including the Gx, Gy, and Gz interfaces).

As is apparent in the system 200 for fixed broadband access network—mobile network integration of FIG. 2, UP traffic must be routed through IPSec tunnel 230 which slows down the traffic. Providing a local offload of such UP traffic to LADN 212 is therefore made less efficient.

Figure 3A:
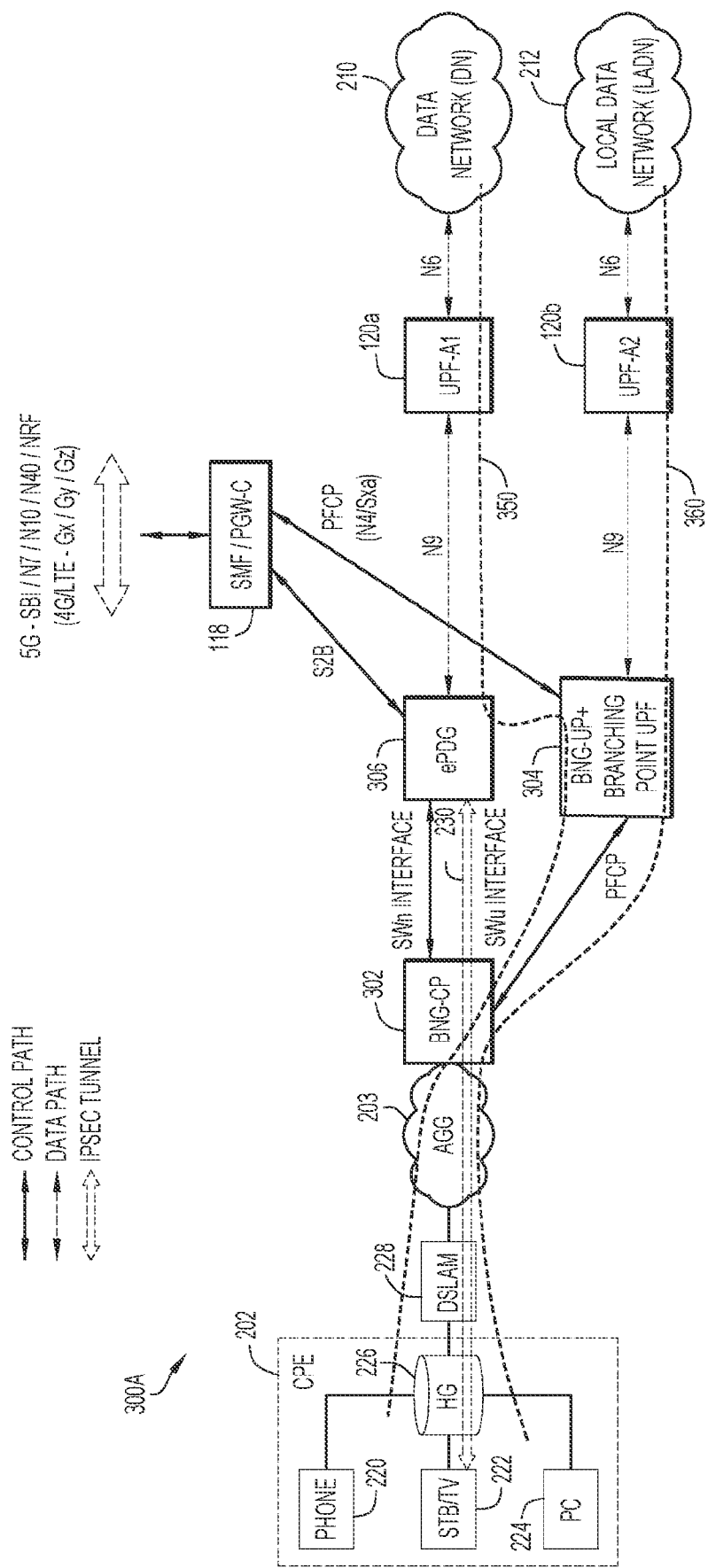
FIG. 3A is an illustrative representation of a system for enhanced fixed broadband access network—mobile network integration between the fixed broadband access network and the 5G network, where enhanced system integration may be achieved with use of a network node having a BNG Control Plane (BNG-CP) function, a network node having a BNG-UP function operative to serve as a Branching Point UPF (or "collocated BNG-UP and BP UPF"), and an ePDG, according to some implementations of the present disclosure.

FIG. 3A is an illustrative representation of a system 300A for enhanced fixed broadband access network—mobile network integration between the fixed broadband access network and the 5G network according to some implementations of the present disclosure. The enhanced system integration includes select network nodes having the same or similar functionality as those described in relation to FIG. 2, albeit with enhancements, modifications, and/or additions as described herein. Here, enhanced system integration may be achieved with use of a network node 302 having a BNG Control Plane (BNG-CP) function, a network node 304 having a BNG-UP function operative to serve as a Branching Point UPF (or "collocated BNG-UP and BP UPF"), and an ePDG 306. As illustrated, network node 302 having the BNG-CP is a network node that is separate and apart from network node 304 having the collocated BNG-UP and BP UPF.

Figure 3B:
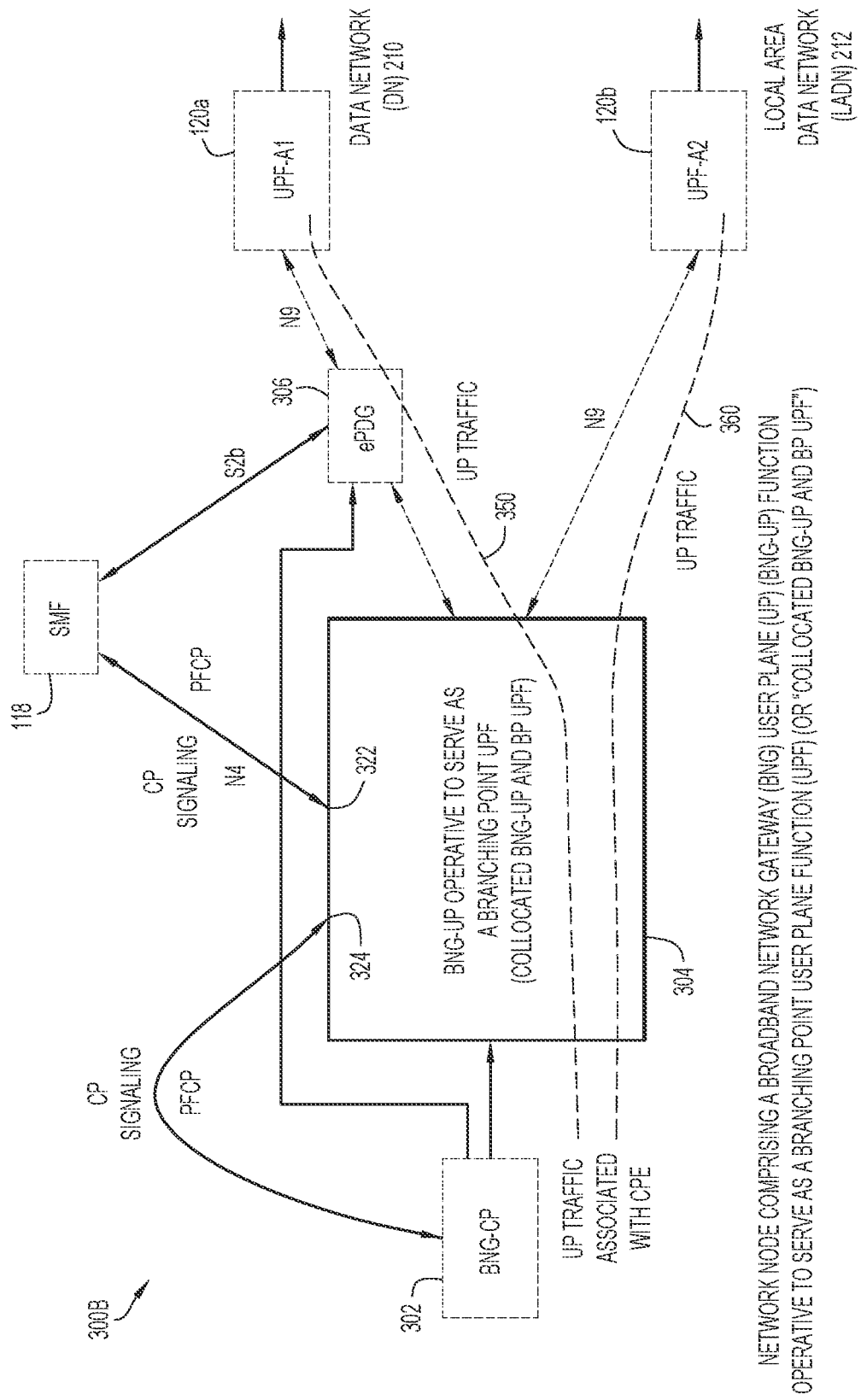
FIG. 3B is an illustrative representation of a network node arrangement including select network nodes of FIG. 3A, primarily to highlight and describe the network node having the collocated BNG-UP/BP-UPF in the enhanced fixed broadband access network—mobile network integration according to some implementations.

FIG. 3B shows a system 300B which includes select network nodes of the system 300A of FIG. 3A, with the purpose of emphasizing the network node 304 having the collocated BNG-UP and BP UPF. Network node 304 having the collocated BNG-UP and BP UPF may operate to perform at least some BNG UP functions as described earlier in relation to FIG. 2, with enhancements, modifications, and/or additions as described herein.

With reference to FIG. 3B, network node 304 having the collocated BNG-UP and BP UPF may be configured to process UP traffic based on one or more sets of rules which are provisioned from the CP. The UP traffic may originate from the CPE, being communicated via network node 302 having the BNG-CP function. In particular, the UP traffic may originate from a UE operating in a wireless network of the fixed broadband access network. The processing of UP traffic may be performed at least in order to forward first UP traffic 350 towards UPF 120a (i.e. a first session anchor) for communicating the first UP traffic 350 to DN 210. The processing of UP traffic may be also performed at least in order to forward second UP traffic 360 towards UPF 120b (i.e. a second session anchor) for communicating the second UP traffic 360 to LADN 212.

The forwarding of the first UP traffic 350 may be made towards and to ePDG 306 which has an N9 interface to interface with UPF 120a, for communicating the first UP traffic 350 to the DN 210. IPSec tunneling with ePDG 306 may be avoided or bypassed, where the UE refrains from performing cryptography on flows which are treated as trusted access. On the other hand, the forwarding of the second UP traffic 360 may made be over an N9 interface towards and to UPF 120b, for communicating the second UP traffic 360 to the LADN 212.

For CP signaling, network node 304 having the collocated BNG-UP and BP UPF may include at least a network interface 322 and a network interface 324. Network interface 322 may be used to interface with the network node comprising the CP for session management (e.g. SMF 118). The network interface 322 may be an N4 interface (or an Sxa interface for 4G/LTE). Network node 304 may be configured to create a (first) session over network interface 322 with SMF 118, for receiving a provisioning of at least some of the rules for processing the UP traffic. On the other hand, network interface 324 may be used to interface with network node 302 having the BNG-CP function. Network node 304 may be configured to create a (second) session over network interface 324 with network node 302 having the BNG-CP function, for receiving a provisioning of at least some of the rules for processing the UP traffic. The first and second sessions may be Packet Forwarding Control Protocol (PFCP) sessions.

During the creation of the first session, network node 304 may obtain a first session identifier of the first session with SMF 118. During the creation of the second session, network node 304 may obtain a second session identifier of the second session with network node 302 having the BNG-CP function. Network node 304 may also receive over network interface 322 the first session identifier from network node 302 having the BNG-CP function, which had obtained the first session identifier from SMF 118 via ePDG 306 during creation of the first session. Accordingly, network node 304 may identify the first and the second sessions as related sessions based on a matching of the first session identifiers obtained in relation to both SMF 118 and the BNG-CP function.

Figure 3C:
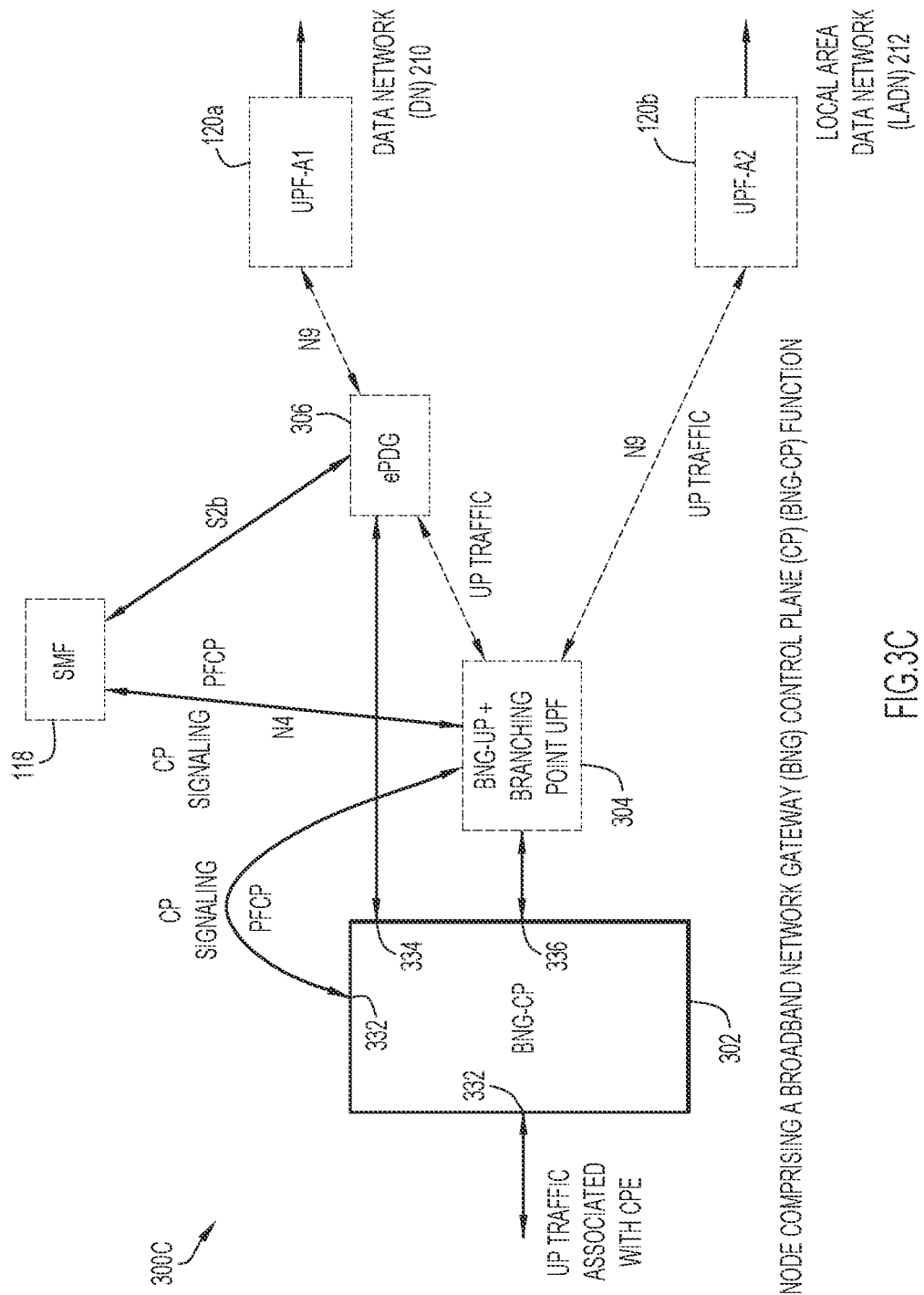
FIG. 3C is an illustrative representation of a network node arrangement including select network nodes of FIG. 3A, primarily to highlight and describe the network node having the BNG-CP function in the enhanced fixed broadband access network—mobile network integration according to some implementations.

FIG. 3C shows a system 300C which includes select network nodes of the system 300A of FIG. 3A, with the purpose of emphasizing the network node 302 having the BNG-CP. Network node 302 having the BNG-CP function may operate to perform at least some of the BNG CP functions as described earlier in relation to FIG. 2, with enhancements, modifications, and/or additions as described herein.

With reference to FIG. 3C, network node 302 having the BNG-CP may include a network interface 330 to receive UP traffic from the CPE and a network interface 336 to route the UP traffic to or towards network node 304 having the collocated BNG-UP and BP UPF. The UP traffic may originate from a UE operating in a wireless network of the fixed broadband access network. As described earlier, network node 304 having the collocated BNG-UP and BP UPF may be configured to process the UP traffic based on one or more sets of rules provisioned from the CP. For CP signaling, network node 302 having the BNG-CP may include at least a network interface 332 to interface with network node 304 having the collocated BNG-UP and BP UPF and a network interface 334 to interface with ePDG 306.

Network node 302 having the BNG-CP function may operative to perform CP signaling procedures for UP traffic handling. In particular, network node 302 having the BNG-CP function may be configured to send, over network interface 334 to ePDG 306, a message indicating an authentication request. The authentication request may be an Internet Key Exchange (IKE) version 2 (IKEv2) authentication request. The message indicating the authentication request may include at least a hostname of the BNG-UP function operative to serve as the Branching Point UPF. In some implementations, the authentication request may include a Fully Qualified Domain Name (FQDN) of the network node 304 having the collocated BNG-UP and BP UPF.

In response, processes outside of the network node 302 having the BNG-CP function are then performed. In particular, ePDG 306 may interact with SMF 118 over the S2b interface, sending a message indicating a request to create a session. In the request, ePDG 306 may send to SMF 118 the hostname (e.g. the FQDN) of network node 304 having the collocated BNG-UP and BP UPF. In response to receiving the request to create a session, SMF 118 may then select network node 304 having the BNG-UP function and create a first session with it. Note that SMF 118 may select the network node 304 having the collocated BNG-UP and BP UPF based on or in response to receiving the hostname (e.g. the FQDN) from the network node 302 having the BNG-CP function. Here, a first session identifier associated with the first session between SMF 118 and network node 304 having the collocated BNG-UP and BP UPF may be generated. The first session may be a PFCP session, and the first session identifier of the first session may be a Fully Qualified Session Endpoint Identifier (F-SEID).

Network node 302 having the BNG-CP function may then receive, from the ePDG 306, a message indicating an authentication response. The authentication response may be an IKEv2 authentication response. The message may include the first session identifier of the first session created between the SMF 118 and the network node having the collocated BNG-UP and BP UPF. The message may also include one or more rules for packet detection and handling, which may be or include a traffic flow template (TFT) or packet detection rule (PDR). The TFT or PDR may be used at a UE to instruct the UE to exclude UP traffic from cryptography associated with IPSec tunneling with ePDG 306, where the flows are treated as trusted access.

Network node 302 having the BNG-CP function may also create a second session with the collocated BNG-UP and BP UPF. The second session may be associated with a second session identifier which is obtained by the BNG-CP function. The second session may also be a PFCP session. For the purposes of matching sessions, network node 302 having the BNG-CP function may further send to network node 304 having the collocated BNG-UP and BP UPF the first session identifier of the first session. Accordingly, the network node 304 having the collocated BNG-UP and BP UPF may identify the first and the second sessions as related sessions based on a matching of the first session identifiers obtained in relation to both SMF 118 and the network node 302 having the BNG-CP function.

Figure 4:
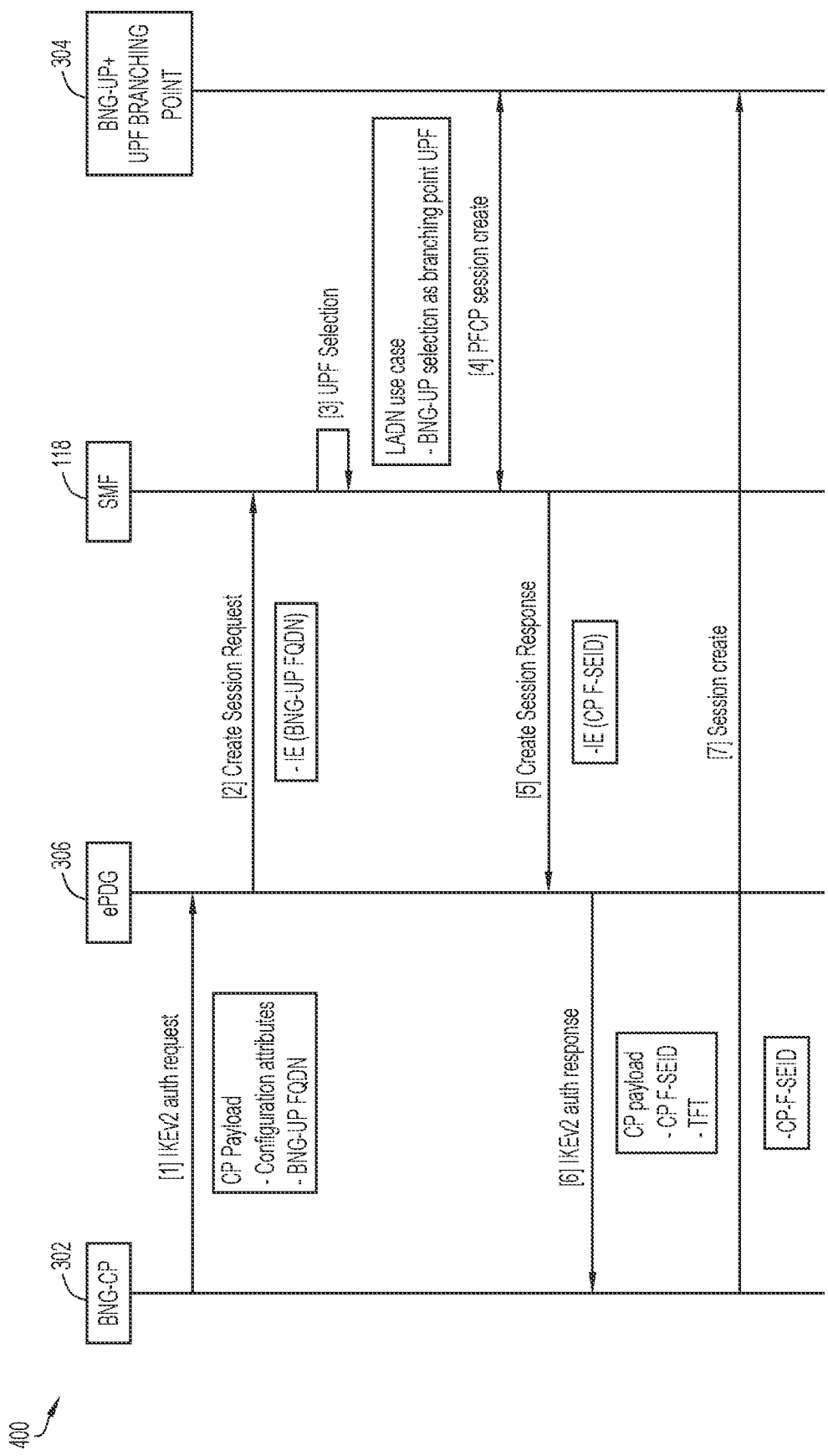
FIG. 4 is a call flow diagram of a call flow for describing a method of facilitating communication in the enhanced fixed broadband access network—mobile network integration according to some implementations of the present disclosure.

FIG. 4 is a call flow diagram 400 of a call flow for describing a method of facilitating communication in the enhanced fixed broadband access network—mobile network integration according to some implementations of the present disclosure. The enhanced fixed broadband access network—mobile network integration may include network node 302 having BNG-CP function for connecting to ePDG 306, as well as for connecting to network node 304 having the collocated BNG-UP and BP UPF.

To begin in relation to FIG. 4, network node 302 having the BNG-CP function may send, to the ePDG 306, a message indicating an authentication request (step 1 of FIG. 4). The message may include at least a hostname of the collocated BNG-UP and BP UPF. In some implementations, the authentication request may be an IKEv2 authentication request, and may include a FQDN of the collocated BNG-UP and BP UPF. The FQDN may be provided as a configuration attribute in the authentication request.

The ePDG 306 may receive the message indicating the authentication request and, in response, may send to SMF 118 a message indicating a create session request for creating a session (step 2 of FIG. 4). The message of step 2 may include the hostname (e.g. the FQDN) of the collocated BNG-UP and BP UPF. Here, the FQDN may be provided as an Information Element (IE) in the create session request. In response to receiving the request to create a session, SMF 118 may select network node 304 having the collocated BNG-UP and BP UPF for the session, at least in the case where the LADN is to be used (step 3 of FIG. 4). SMF 118 may select this network node based on or in response to receiving its hostname (e.g. the FQDN).

Accordingly, SMF 118 may create a session with the selected network node 304 having the collocated BNG-UP and BP UPF (step 4 of FIG. 4). The session may be referred to as a first session. Here, a first session identifier associated with the first session between SMF 118 and network node 304 having the collocated BNG-UP and BP UPF may be generated. The first session may be a PFCP session, and the first session identifier of the first session may be an F-SEID. SMF 118 may send to the ePDG 306 a message indicating a create session response (step 5 of FIG. 4). The message indicating the create session response may include the first session identifier (e.g. the F-SEID) of the first session created between SMF 118 and network node 304 having the collocated BNG-UP and BP UPF.

The ePDG 306 may receive, from SMF 118, the message indicating the create session response which includes the first session identifier (e.g. the F-SEID). In response, the ePDG 306 may send, to network node 302 having the BNG-CP function, a message indicating an authentication response (e.g. an IKEv2 authentication response) (step 6 of FIG. 4). The message indicating the authentication response may include the first session identifier (e.g. the F-SEID) of the first session. The authentication response may also include one or more rules for packet detection and handling, which may be or include a TFT or PDR. Network node 302 having the BNG-CP function may receive, from the ePDG 306, the message indicating the authentication response which includes the first session identifier and the TFT or PDR. The TFT or PDR may be used at a UE to instruct the UE to exclude UP traffic from cryptography associated with IPSec tunneling, treating the flows as trusted access.

Further, network node 302 may send, to network node 304 having the collocated BNG-UP and BP UPF, a message indicating a create session request (step 7 of FIG. 4). The message indicating the create session request is for creating a second session between network node 304 having the BNG-CP function and network node 304 having the collocated BNG-UP and BP UPF. Here, a second session identifier associated with the second session between network node 302 having the BNG-CP function and network node 304 having the collocated BNG-UP and BP UPF may be generated. The second session may also be a PFCP session, and the second session identifier of the second session may be an F-SEID.

For purposes of matching sessions, network node 302 having the BNG-CP function may further send, to network node 304 having the collocated BNG-UP and BP UPF, the first session identifier of the first session associated with SMF 118 (step 7.5 of FIG. 4). This first session identifier may be communicated so that network node 304 having the collocated BNG-UP and BP UPF may be able to identify the first and the second sessions as related sessions, based on a matching of the first session identifiers received from both SMF 118 and network node 302 having the BNG-CP function.

Figure 5A:
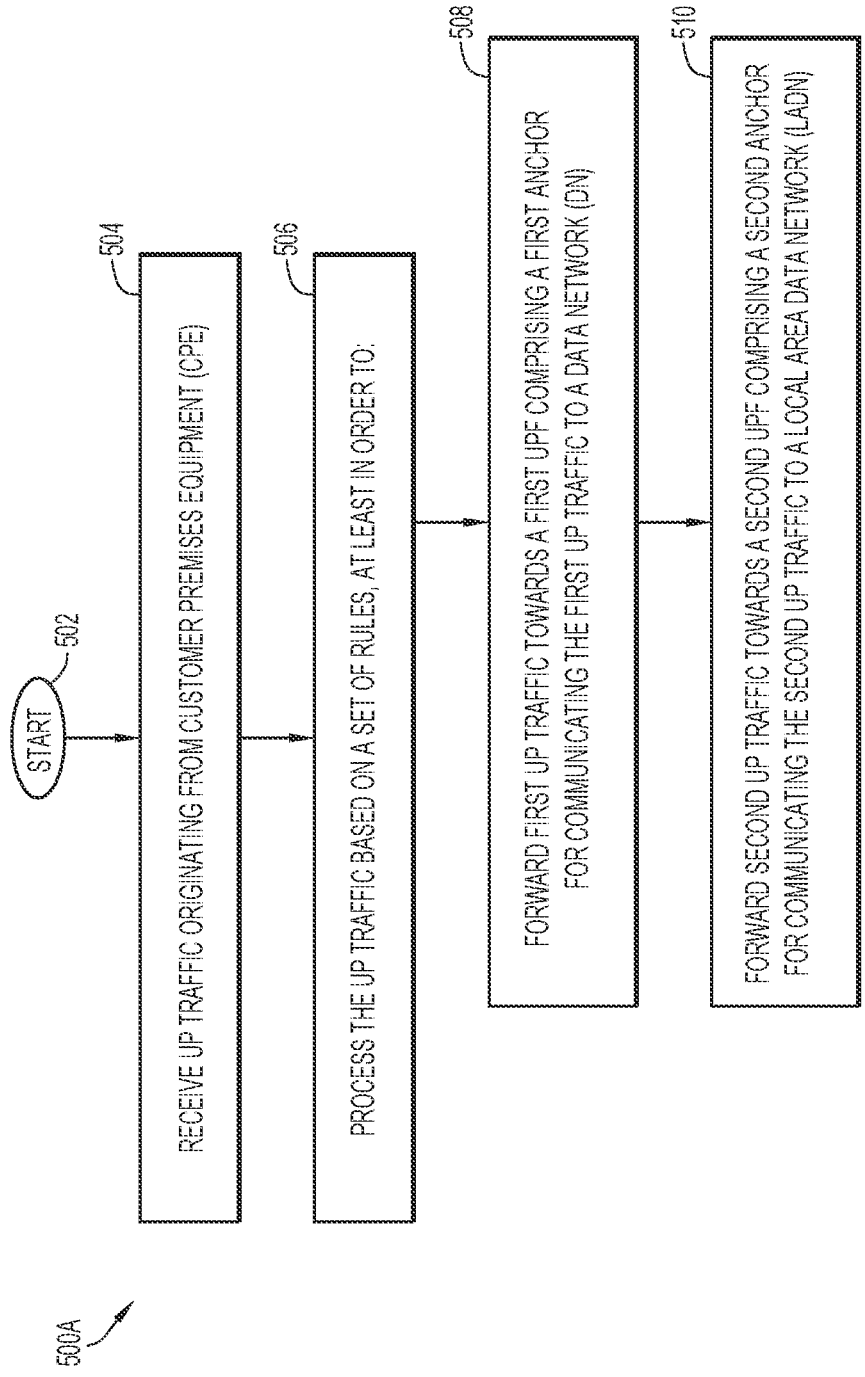
Figure 5C:
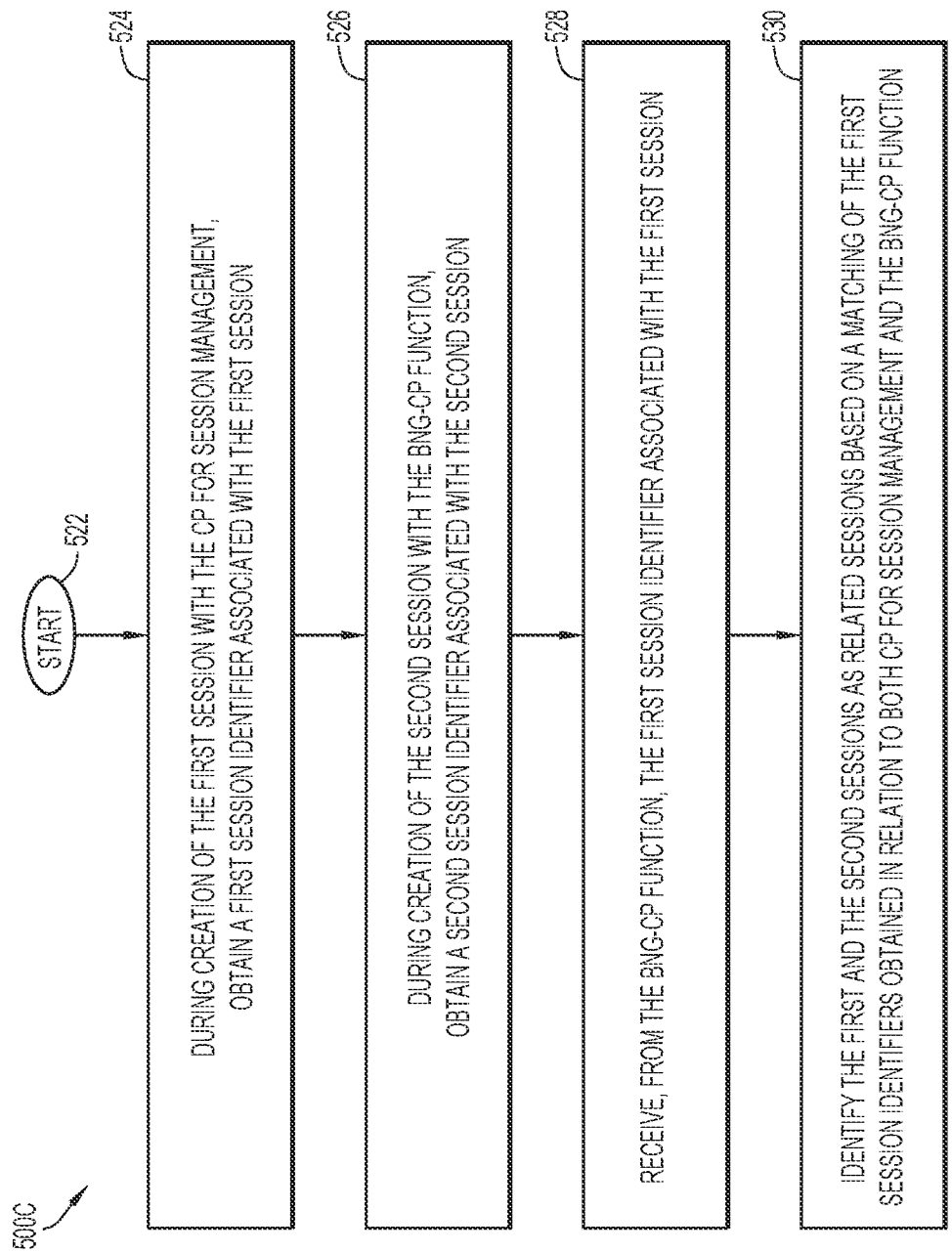

FIGS. 5A-5C are flowcharts 500A-500C of methods of facilitating communication in an enhanced fixed broadband access network—mobile network integration according to some implementations of the present disclosure. The methods of FIG. 5A-5C may be performed by the network node having the BNG-UP operative to serve as the Branching Point UPF (or "collocated BNG-UP and BP UPF") in the enhanced fixed broadband access network—mobile network integration. The methods may be embodied as a computer program product including a non-transitory computer readable medium and instructions stored in the computer readable medium, where the instructions are executable on one or more processors of the network node for performing the steps of the methods.

With reference to FIG. 5A, beginning at a start block 502 of the flowchart 500A of FIG. 5A, the network node having the collocated BNG-UP and BP UPF may receive UP traffic from the CPE (step 504 of FIG. 5A). In some implementations, the UP traffic may originate from the CPE, communicated via the network node having the BNG-CP function. The network node having the collocated BNG-UP and BP UPF may process the UP traffic based on one or more sets of rules (step 506 of FIG. 5A). These rules may be provisioned at the network node according to CP signaling over established PFCP sessions. The processing of UP traffic may be performed at least in order to forward first UP traffic towards a first UPF of a first session anchor for communicating the first UP traffic to a DN (step 508 of FIG. 5A), and/or to forward second UP traffic towards a second UPF of a second session anchor for communicating the second UP traffic to a LADN (step 510 of FIG. 5A).

More specifically with respect to step 508 of FIG. 5A, the forwarding of the first UP traffic may be towards and to an ePDG which has an N9 interface to interface with the first UPF for communicating the first UP traffic to the DN. Here, IPSec tunneling with the ePDG may be avoided or bypassed. More specifically with respect to step 510 of FIG. 5A, the forwarding of the second UP traffic may be over an N9 interface towards and to the second UPF for communicating the second UP traffic to the LADN.

Again, the network node having the collocated BNG-UP and BP UPF may process the UP traffic based on one or more sets of rules as indicated in step 506, and these rules may be provisioned according to CP signaling. With reference to FIG. 5B, beginning at a start block 512 of the flowchart 500B of FIG. 5B, the network node may create a first session with a CP for session management (e.g. an SMF), for receiving a provisioning of at least some of the rules for processing the UP traffic (step 514 of FIG. 5B). On the other hand, the network node 304 having the collocated BNG-UP and BP UPF may create a second session with the network node having the BNG-CP function, for receiving a provisioning of at least some of the rules for processing the UP traffic (step 516 of FIG. 5B). The first and second sessions may be PFCP sessions.

With reference now to FIG. 5C, beginning at a start block 522 of the flowchart 500C of FIG. 5C, during the creation of the first session with the CP for session management, the network node having the collocated BNG-UP and BP UPF may obtain a first session identifier of the first session (step 524 of FIG. 5C). During the creation of the second session with the BNG-CP function, the network node having the collocated BNG-UP and BP UPF may obtain a second session identifier of the second session (step 526 of FIG. 5C). For purposes of session matching, network node having the collocated BNG-UP and BP UPF may also receive the first session identifier from the network node having the BNG-CP function (step 528 of FIG. 5C). Note that the network node having the BNG-CP function had obtained the first session identifier from the CP for session management via the ePDG during creation of the first session. Accordingly, the network node having the collocated BNG-UP and BP UPF may identify the first and the second sessions as related sessions based on a matching of the first session identifiers received in relation to both the CP for session management and the BNG-CP function (step 530 of FIG. 5C).

Figure 6:
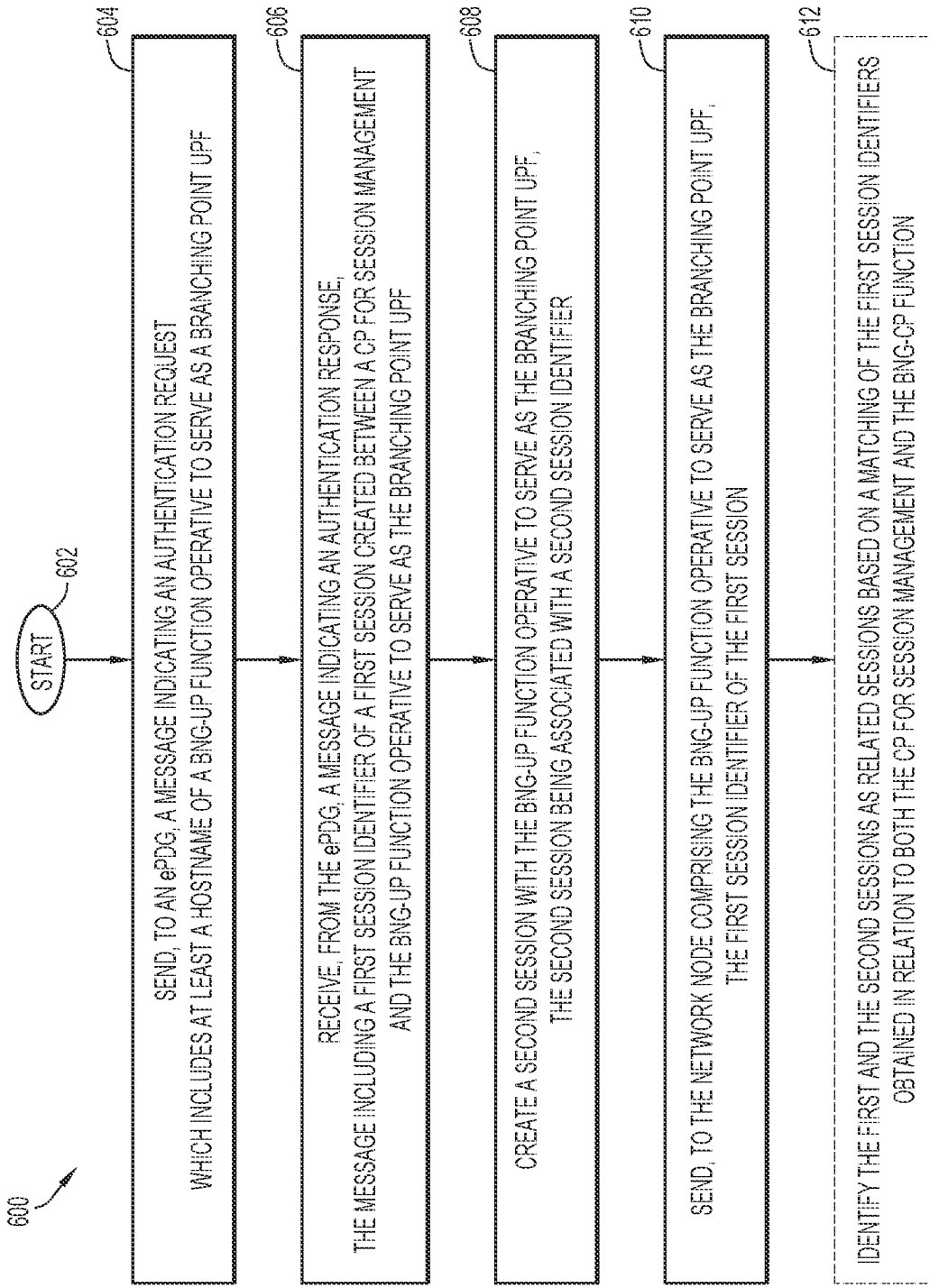
FIG. 6 is a flowchart of a method of facilitating communication by the network node having the BNG-CP function in the enhanced fixed broadband access network—mobile network integration according to some implementations.

FIG. 6 is a flowchart 600 of a method of facilitating communication in an enhanced fixed broadband access network—mobile network integration according to some implementations of the present disclosure. The method may be performed by the network node having the BNG-CP function in the enhanced fixed broadband access network—mobile network integration. The method may be embodied as a computer program product including a non-transitory computer readable medium and instructions stored in the computer readable medium, where the instructions are executable on one or more processors of the network node for performing the steps of the method.

In FIG. 6, the network node having the BNG-CP function may operative to perform CP signaling procedures for UP traffic handling. Beginning at a start block 602 of FIG. 6, the network node having the BNG-CP function may send to the ePDG, a message indicating an authentication request (step 604 of FIG. 6). The authentication request may be an IKEv2 authentication request. The message indicating the authentication request may include at least a hostname of the collocated BNG-UP and BP UPF. In some implementations, the authentication request may include FQDN of the network node having the collocated BNG-UP and BP UPF.

In response, processes outside of the network node having the BNG-CP function may be performed. In particular, the ePDG may interact with the CP for session management (e.g. SMF), sending a message indicating a request to create a session. In the request, the ePDG may send to the CP for session management the hostname (e.g. the FQDN) of the network node having the collocated BNG-UP and BP UPF. In response to receiving the request to create a session, CP for session management may then select the network node having the collocated BNG-UP and BP UPF and create a first session with it. Note that the CP for session management may select the network node having the collocated BNG-UP and BP UPF based on or in response to receiving the hostname (e.g. the FQDN) from the network node having the BNG-CP function. Here, a first session identifier associated with the first session between the CP for session management and the network node having the collocated BNG-UP and BP UPF may be generated. The first session may be a PFCP session, and the first session identifier of the first session may be F-SEID.

The network node having the BNG-CP function may then receive, from the ePDG, a message indicating an authentication response (step 606 of FIG. 6). The authentication response may be an IKEv2 authentication response. The message may include the first session identifier of the first session created between the SMF 118 and the network node having the collocated BNG-UP and BP UPF. The message may further include one or more rules for packet detection and handling, which may be or include a TFT or PDR. The TFT or PDR may be used at a UE to instruct the UE to exclude UP traffic from cryptography associated with IPSec tunneling, treating the flows as trusted access.

The network node having the BNG-CP function may also create a second session with the collocated BNG-UP and BP UPF (step 608 of FIG. 6). The second session may be associated with a second session identifier which is obtained by the BNG-CP function. The second session may also be a PFCP session. The network node having the BNG-CP function may further send to the network node having the collocated BNG-UP and BP UPF the first session identifier of the first session (step 610 of FIG. 6).

Accordingly, the network node having the collocated BNG-UP and BP UPF may identify the first and the second sessions as related sessions based on a matching of the first session identifiers obtained in relation to both the CP for session management and the BNG-CP function (step 612 of FIG. 6). Rule provisioning of the network node having the collocated BNG-UP and BP UPF may be performed over the first and the second sessions. Again, the network node having the collocated BNG-UP and BP UPF may process the UP traffic based on one or more of rules which may be provisioned at the network node according to CP signaling from the CP for session management and the BNG-CP function. The processing of UP traffic may be performed at least in order to forward (e.g. via the ePDG) first UP traffic towards a first UPF of a first session anchor for communicating the first UP traffic to a DN, and to forward second UP traffic towards a second UPF of a second session anchor for communicating the second UP traffic to a LADN.

Figure 7:
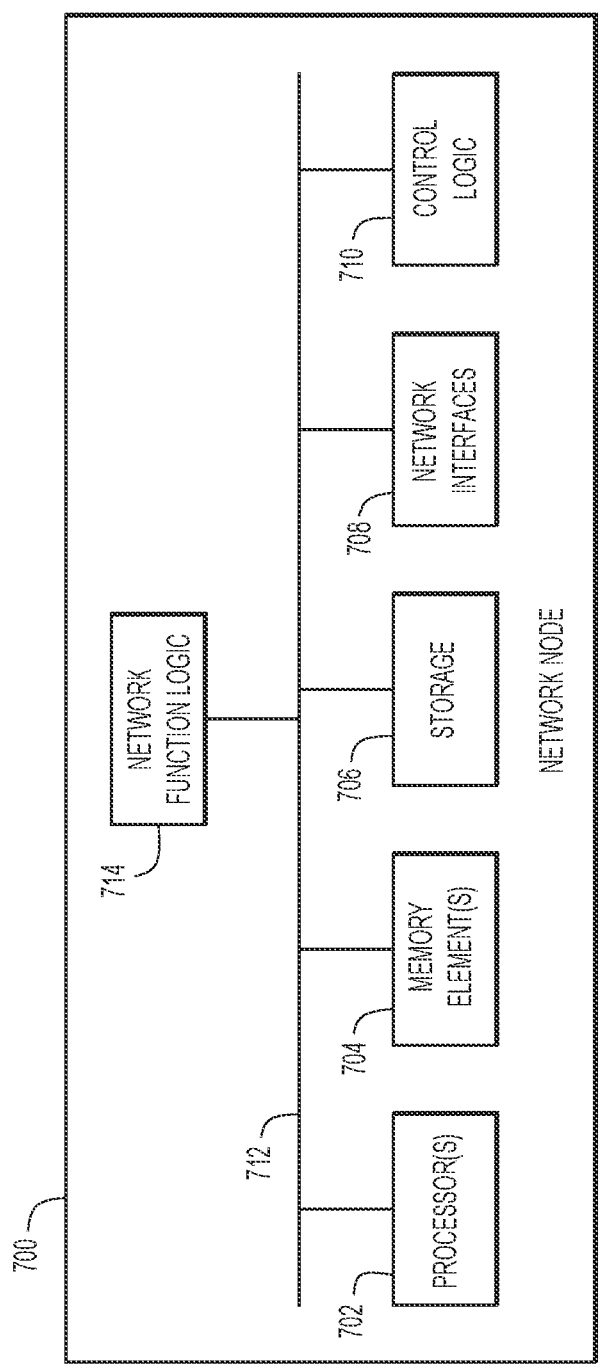
FIG. 7 is a block diagram of a network node (network equipment, a compute or computing node) for a network function, such as that which may be associated with BNG-CP function in the enhanced fixed broadband access network—mobile network integration, according to some implementations.

FIG. 7 is a block diagram illustrating a network node 700 (network equipment, a compute or computing node) for a network function, such as that which may be associated with BNG-CP function, for example, in accordance with at least some implementations described herein. In various embodiments, network element functionality may be performed using any combination of network nodes. In various embodiments, network node 700 can be implemented as, for example, a data center network node such as a server, rack of servers, multiple racks of servers, etc., for a data center; or a cloud network node, which may be distributed across one or more data centers.

In some implementations, network node 700 may include may include one or more processors 702, one or more memory elements 704, storage 706, network interfaces 708, control logic 710 and network function logic 714. In some implementations, the processors 702 are at least one hardware processor configured to execute various tasks, operations and/or functions for network node 700 as described herein according to software and/or instructions configured for the network node 700. In some implementations, memory elements 704 and/or storage 706 are configured to store data, information, software, instructions, logic (e.g. any logic 710 and/or 714), data structures, combinations thereof, or the like for various embodiments described herein. Note that in some implementations, storage may be consolidated with memory elements (or vice versa), or may overlap/exist in any other suitable manner.

In some implementations, network interfaces 708 enable communication between for network node 700 and other network elements, systems, slices, etc. that may be present in the system to facilitate operations as discussed for various embodiments described herein. In some implementations, network interfaces 708 may include one or more Ethernet drivers and/or controllers, Fibre Channel drivers, and/or controllers, or other similar network interface drivers and/or controllers to enable communications for network node 700 within the system.

In some implementations, control logic 710 may include instructions that, when executed (e.g. via processors 702), cause for network node 700 to perform operations, which may include, but not be limited to, providing overall control operations of network node 700; cooperating with other logic, data structures, etc. provisioned for and/or maintained by network node 700; combinations thereof; or the like to facilitate various operations as discussed for various embodiments described herein.

In some implementations, bus 712 may be configured as an interface that enables one or more elements of network node 700 (e.g. processors 702, memory elements 704, logic, etc.) to communicate in order to exchange information and/or data. In at least one embodiment, bus 712 may be implemented as a fast kernel-hosted interconnect, potentially using shared memory between processes (e.g. logic, etc.), which may enable efficient communication paths between the processes.

In some implementations, network function logic 714 may include instructions that, when executed (e.g. via one or more processors 702) cause network node 700 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a system or network may represent a series of points or nodes of interconnected communication paths (wired or wireless) for receiving and transmitting packets of information that propagate through the network. In some implementations, a network may be associated with and/or provided by a single network operator or service provider and/or multiple network operators or service providers. In various embodiments, the network may include and/or overlap with, in whole or in part, one or more packet data network(s) (e.g. one or more packet data networks). A network may offer communicative interfaces between various elements and may be further associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, Low Power Wide Area Network (LPWAN), Low Power Network (LPN), Machine to Machine (M2M) network, IoT Network, or any other appropriate architecture or system that facilitates communications in a network environment.

In various embodiments, a UE may be associated with any electronic device seeking to initiate a flow in the system via some network. In at least one embodiment, a UE may be configured to facilitate simultaneous WLAN connectivity and 3GPP connectivity within the system. The terms 'UE', 'mobile device,' mobile radio device,' 'end device', 'user', 'subscriber' or variations thereof may be used herein interchangeably and are inclusive of devices used to initiate a communication, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software [potentially inclusive of object code and source code] to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first UPF could be termed a second UPF, and similarly, a second UPF could be termed a first UPF, without changing the meaning of the description, so long as all occurrences of the "first UPF" are renamed consistently and all occurrences of the "second UPF" are renamed consistently. The first UPF and the second UPF are both UPFs, but they are not the same UPF.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method for use in interworking between a fixed broadband access network and a mobile network, the method comprising:
at a network node configured with a collocated broadband network gateway user plane (BNG-UP) and Branching Point User Plane Function (UPF),
creating, with a control plane function for session management of the mobile network, a first session for control plane signaling associated with a first session identifier;
creating, with a broadband network gateway control plane (BNG-CP) function of the fixed broadband access network, a second session for control plane signaling associated with a second session identifier; and
processing user plane traffic associated with customer premises equipment of the fixed broadband access network according to one or more rules provisioned in the first and the second sessions for control plane signaling,
wherein the first and the second sessions are identified as related sessions for the processing of the user plane traffic, based on a matching of the first session identifier of the first session for control plane signaling with a received first session identifier that is received from the BNG-CP function.

2. The method of claim 1, wherein the processing of the user plane traffic from the customer premises equipment of the fixed broadband access network comprises:
forwarding first user plane traffic towards a first UPF anchor for communicating the first user plane traffic to a Data Network (DN); and
forwarding second user plane traffic towards a second UPF anchor for communicating the second user plane traffic to a Local Area Data Network (LADN).

3. The method of claim 2, wherein forwarding the first user plane traffic further comprises forwarding the first user plane traffic towards a packet data gateway having interworking control, which has an interface with the first UPF anchor for communicating the first user plane traffic to the DN.

4. The method of claim 1, further comprising:
at the network node configured with the collocated BNG-UPF and Branching Point UPF,
receiving, via the BNG-CP function of the fixed broadband access network, the user plane traffic associated with the customer premises equipment.

5. The method of claim 1, further comprising:
at the network node configured with the collocated BNG-UPF and Branching Point UPF,
receiving the user plane traffic associated with the customer premises equipment which comprises a user equipment (UE) operative in the fixed broadband access network.

6. The method of claim 1, further comprising:
at the network node configured with the collocated BNG-UPF and Branching Point UPF,
receiving the received first session identifier from the BNG-CP function of the fixed broadband access network during the creating of the second session for control plane signaling with the BNG-CP function.

7. The method of claim 1, wherein the first and the second sessions for control plane signaling comprise first and second Packet Forwarding Control Protocol (PFCP) sessions, respectively.

8. The method of claim 1, wherein the first and the second session identifiers comprise first and second Fully Qualified Session IDs (F-SEIDs), respectively.

9. The method of claim 1, further comprising:
at the network node configured with the collocated BNG-UPF and Branching Point UPF,
interfacing, via an interface, with the control plane function for session management comprising one of a Packet Gateway—Control Plane (PGW-C) or a Session Management Function (SMF).

10. The method of claim 9, wherein the interface comprises one of an N4 interface or an Sxa interface.

11. A network node comprising:
one or more processors;
one or more memory elements;
instructions stored in the one or more memory elements;
the instructions being executable by the one or more processors to provide a collocated broadband network gateway user plane (BNG-UP) and Branching Point User Plane Function (UPF), for:
creating, with a control plane function for session management of a mobile network, a first session for control plane signaling associated with a first session identifier;
creating, with a broadband network gateway control plane (BNG-CP) function of a fixed broadband access network, a second session for control plane signaling associated with a second session identifier; and
processing user plane traffic associated with customer premises equipment of the fixed broadband access network according to one or more rules provisioned in the first and the second sessions for control plane signaling,
wherein the first and the second sessions are identified as related sessions for the processing of the user plane traffic, based on a matching the first session identifier of the first session for control plane signaling with a received first session identifier that is received from the BNG-CP function.

12. The network node of claim 11, wherein the instructions are executable for the processing of the user plane traffic associated with the customer premises equipment of the fixed broadband access network further for:
forwarding first user plane traffic towards a packet data gateway having interworking control, which has an interface with a first UPF anchor for communicating the first user plane traffic to a data network (DN); and
forwarding second user plane traffic towards a second UPF anchor for communicating the second user plane traffic to a Local Area Data Network (LADN).

13. The network node of claim 12, wherein the instructions are executable for:
interfacing, via an interface, with the control plane function for session management comprising one of a Packet Gateway—Control Plane (PGW-C) or a Session Management Function (SMF);
receiving the received first session identifier from the BNG-CP function of the fixed broadband access network during the creating of the second session for control plane signaling with the BNG-CP function; and receiving the user plane traffic associated with the customer premises equipment which comprises a user equipment (UE) operative in the fixed broadband access network.

14. A method for use in interworking between a fixed broadband access network and a mobile network, the method comprising:
at a network node having a broadband network gateway control plane (BNG-CP) function,
sending, to a packet data gateway having interworking control, a message indicating an authentication request, including at least a hostname of a network node having a collocated broadband network gateway user plane (BNG-UP) and Branching Point User Plane Function (UPF) configured to process user plane traffic associated with customer premises equipment of the fixed broadband access network;
receiving, from the packet data gateway having the interworking control, a message indicating an authentication response, including a first session identifier of a first session for control plane signaling that is created between a control plane function for session management of the mobile network and the network node having the collocated BNG-UPF and Branching Point UPF; and
sending, to the network node having the collocated BNG-UPF and Branching Point UPF, a message for creating a second session for control plane signaling with the network node having the collocated BNG-UPF and Branching Point UPF, including the first session identifier of the first session for control plane signaling for identification of the first and the second sessions as related sessions by the network node having the collocated BNG-UPF and Branching Point UPF for processing the user plane traffic.

15. The method of claim 14, wherein the network node having the collocated BNG-UPF and Branching Point UPF is configured to process the user plane traffic from the customer premises equipment of the fixed broadband access network based on one or more rules, at least in order to:
forward first user plane traffic towards the packet data gateway having the interworking control, which has an interface with a first UPF anchor for communicating the first user plane traffic to a Data Network (DN); and
forward second user plane traffic towards a second UPF anchor for communicating the second user plane traffic to a Local Area Data Network (LADN).

16. The method of claim 14, further comprising:
at the network node having the BNG-CP function,
receiving the user plane traffic from the customer premises equipment of the fixed broadband access network; and
routing the user plane traffic to the network node having the collocated BNG-UPF and Branching Point UPF which is configured to process the user plane traffic based on one or more sets of rules, at least in order to forward first user plane traffic towards the packet data gateway having the interworking control which has an interface with a first UPF anchor for communicating the first user plane traffic to a Data Network (DN), and forward second user plane traffic towards a second UPF anchor for communicating the second user plane traffic to a Local Area Data Network (LADN).

17. The method of claim 14, wherein receiving the message indicating the authentication response includes one or more rules for packet detection and handling at a user equipment (UE) operative in the fixed broadband access network, for instructing the UE to exclude the user plane traffic from cryptography for tunneling with the packet data gateway having the interworking control.

18. The method of claim 17, wherein the one or more rules for the UE are provided in a traffic flow template (TFT) or a packet detection rule (PDR).

19. The method of claim 14, wherein receiving the message indicating the authentication response includes a traffic flow template (TFT) or a packet detection rule (PDR) for a user equipment (UE) operative in the fixed broadband access network, for instructing the UE to exclude the user plane traffic from cryptography for tunneling with the packet data gateway having the interworking control, the method further comprising:
at the network node having the BNG-CP function,
receiving the user plane traffic from the customer premises equipment of the fixed broadband access network;
routing the user plane traffic to the network node having the collocated BNG-UPF and Branching Point UPF which is configured to process the user plane traffic based on one or more sets of rules, at least in order to: forward first user plane traffic towards the packet data gateway having the interworking control, which has an interface with a first UPF anchor for communicating the first user plane traffic to a Data Network (DN), and forward second user plane traffic towards a second UPF anchor for communicating the second user plane traffic to a Local Area Data Network (LADN).

20. The method of claim 14, wherein:
the message indicating the authentication request comprises an Internet Key Exchange (IKE) authentication request, and
the message for creating the second session for control plane signaling comprises a create session request.

* * * * *